United States Patent [19]
Rogier et al.

[11] 3,957,733
[45] May 18, 1976

[54] $C_{19}$ DIACID TRIMETHYLHEXAMETHYLENE DIAMINE POLYAMIDES

[75] Inventors: Edgar R. Rogier, Hopkins; Allen H. Jevne, Anoka; Gerald L. Schwebke, Minneapolis, all of Minn.

[73] Assignee: Inc. General Mills Chemicals, Minneapolis, Minn.

[22] Filed: May 28, 1974

[21] Appl. No.: 473,866

[52] U.S. Cl.............................. 260/78 R; 260/18 N; 260/33.4 P
[51] Int. Cl.².................................. C08G 69/26
[58] Field of Search.................. 260/78 R, 18 N

[56] References Cited
UNITED STATES PATENTS

| | | | |
|---|---|---|---|
| 3,198,771 | 8/1965 | Gabler | 260/78 R |
| 3,294,759 | 12/1966 | Gabler | 260/78 R |
| 3,781,234 | 12/1973 | Drawert et al. | 260/78 R |

*Primary Examiner*—Harold D. Anderson
*Attorney, Agent, or Firm*—Anthony A. Juettner; Patrick J. Span; Elizabeth Tweedy

[57] ABSTRACT

Polyamides of a $C_{19}$ diacid and trimethylhexamethylene diamine useful as an engineering plastic.

2 Claims, No Drawings

$C_{19}$ DIACID TRIMETHYLHEXAMETHYLENE DIAMINE POLYAMIDES

This invention relates to polyamides formed by the amidification reaction of trimethylhexamethylene diamine and heptadecane dicarboxylic acid. More particularly, this invention relates to polyamides formed by the amidification reaction of trimethylhexamethylene diamine and heptadecane dicarboxylic acid having the formula

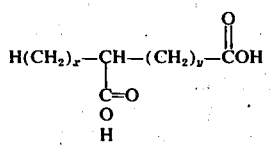

wherein $x$ is an integer from 1 to 15, $y$ is an integer from 1 to 15, and the sum of $x$ and $y$ is 16, and wherein the amidification product has a logarithmic viscosity number of about 30 to 150 measured in orthochlorophenol solvent at a concentration of 0.005 g./ml. at a temperature of 30°C. In making the polyamides of this invention, the methyl or ethyl ethers of the above acids can be used as well as the acids.

DETAILED DESCRIPTION OF THE INVENTION

The heptadecane dicarboxylic acids useful in making the polyamides of this invention can be prepared by the addition of carbon monoxide and water to an unsaturated acid, preferably oleic acid. Preparation is shown in Reppe and Kroper, Ann. 582, 63–65 (1953), herein incorporated by reference. The reaction involved is illustrated graphically below:

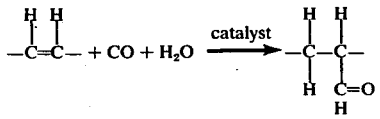

where

represents the ethylene unsaturation of the fatty acid molecule.

An alternative method is to react the carbon monoxide and unsaturated fatty acid in the presence of hydrogen to get the aldehyde or alcohol or mixtures thereof which are then oxidized to the acid as shown below:

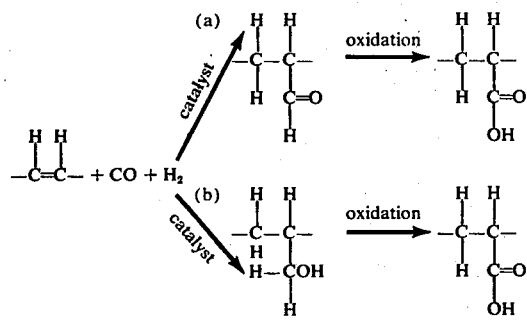

The final acid product is a mixture of isomers having one more carbon atom than the starting material. Starting with a $C_{18}$ unsaturated fatty acid such as oleic acid, the final product will be a mixture of isomers of $C_{19}$ diacids. The product might also be regarded as a stearic acid substituted with a carboxy group along the fatty chain.

The preferred acid employed in this invention is the $C_{19}$ diacids prepared from the oxonation of oleic acid. However, other $C_{18}$ unsaturated fatty acids such as linoleic, linolenic, ricinoleic and elaidic or mixtures thereof may be employed. The trimethylhexamethylene diamine may be either 2,2,4-trimethylhexamethylene diamine or 2,4,4-trimethylhexamethylene diamine of mixtures thereof.

The amidification reaction involving the $C_{19}$ diacid and trimethylhexamethylene diamine can be performed in the conventional manner, for example by heating the acid and the diamine until substantially complete condensation takes place. The reaction can be completed at temperatures between about 100°C. and 300°C. A typical melt polymerization technique can be used. The classic melt polymerization technique includes blending the reactants at a low temperature in an atmosphere of inert gas in a reactor fitted with an efficient agitator and raising the temperature gradually to the point where water from the reaction starts to form and can be distilled off which is about 180°C. to 250°C. The water vapor is vented from the reactor until the rate of water formation becomes quite slow. At that point a partial vacuum, i.e. 20 mm. Hg. is drawn and the temperature increased from about 250°C. to about 270°C. to induce further water removal. Final condensation can be achieved by applying a high vacuum to the reaction mixture, i.e. 1 mm. Hg. Once the condensation reaction is complete, the vacuum is broken with an inert gas and the polyamide removed from the reactor. A clear, light colored solid is formed upon cooling.

In conducting the amidification reaction, optimum results are obtained when equal equivalents of the $C_{19}$ diacid and diamine are condensed together. Satisfactory product can be obtained, however, when there is a difference in equivalents of 0 to about 10%. The polyamides are of sufficient molecular weight to produce logarithmic viscosity number of about 30 to 150 ml./g. and preferably about 40 to 120 ml./g., measured in orthochlorophenol solvent at a concentration of 0.005 g./ml. and a temperature of 30°C. and determined according to ASTM Test Procedure D2857-70.

Amidification catalysts such as triphenyl phosphite can be included in the reaction mixture to increase the reaction rate.

Monocarboxylic acids, preferably the fatty acids, containing 12 to 18 carbon atoms, more preferably 18 carbon atoms, can also be added to the acid component to control molten viscosity. Linoleic acid, oleic acid, stearic acid or mixtures thereof are particularly preferred. Monocarboxylic aromatic acids such as benzoic acid can also be used for this purpose. These monocarboxylic acids can be included in amounts up to about 1.5 equivalent percent of the acid component.

The polyamides of this invention possess a high degree of toughness, as exemplified by high tensile strength and elongation properties. The modulus of elasticity of these polyamides is achieved rapidly upon fabricating the polyamides into molded articles. One method of fabricating these polyamides into molded articles is to extrude the heated resin into a mold. The extruded resin is usually in the form of a ball and there are air spaces between it and the sides of the mold. Mechanical pressure is applied to the resin to squeeze it into the mold. The resin is allowed to become firm and the finished article is removed from the mold. The polyamides are particularly useful as adhesives for metals. They can be used as hot melt adhesives or as adhesives when dissolved in a volatile solvent.

The mechanical properties of polyamides can be characterized on an Instron Tensile Tester Model TTC using ASTM D638-71a and D1708-66. The polyamide is compression molded into a 6 inch × 6 inch sheet of approximately 0.04 inch thickness at a temperature near its melting point (usually a few degrees higher than the melting point) and at 40,000 lbs. load or higher using silicone release agents as the parting agent in the mold. From this sheet, test specimens are die cut to provide means of determining the mechanical properties of the polymer. For tensile strengths and elongation of the polymer the test specimens and procedures given ASTM 1708-66 were used. Using a cross head speed of 0.5 inch/minute tensile strength at break, tensile strength at yield and percentage elongation were determined. Modulus of elasticity was determined using specimen type IV and the procedures of ASTM standard test D638-71a using a cross head speed of 0.05 inch/minute. In addition to the tensile properties outlined above, the following properties of the polymers were measured: 1. Ball and Ring softening point by ASTM E28-67, and 2. Flexural modulus by ASTM D790-71.

The results obtained from the above measurements and set out in the following Example show that the polyamides of this invention are far tougher than polyamides obtained from the amidification reaction of trimethylhexamethylene diamine and polymeric fatty acids and the amidification product of hexamethylene and heptadecane dicarboxylic acid.

The polymeric fatty acid shown below for purposes of comparison with the heptadecane dicarboxylic acid was made by commercial processing.

Polymeric fat acids are commercially available products. A description of polymeric fat acids and their method of preparation may be found in U.S. Pat. No. 3,157,681 which disclosure is herein incorporated by reference. As set out in that disclosure, polymeric fat acids can result from the catalytic polymerization of ethylenically or acetylenically unsaturated monocarboxylic aliphatic acids containing from 8 to 22 carbon atoms. Unsaturated aliphatic monocarboxylic acids can also be polymerized in the absence of a catalyst. Unsaturated aliphatic monocarboxylic acids having 16 to 18 carbon atoms are preferred for purposes of the present invention. Most preferred are unsaturated, aliphatic monocarboxylic acids containing 18 carbon atoms. Linoleic and oleic acids are examples of useful unsaturated aliphatic monocarboxylic acids containing 18 carbon atoms. Linoleic and oleic acids are examples of useful unsaturated aliphatic monocarboxylic acids containing 18 carbon atoms.

After polymerization with or without a catalyst, the resulting mixture contains predominantly dimeric fat acids, some trimeric and higher polymeric fat acids and some unpolymerized monomeric fat acids. Typical compositions of commercially available polymeric fat acids based on unsaturated $C_{18}$ fat acids are:

$C_{18}$ monocarboxylic acids 5–15% by weight;
$C_{36}$ dicarboxylic acids 60–80% by weight; and $C_{54}$ (and higher) tricarboxylic acids 10–35% by weight.

These mixtures may be fractionated by suitable means such as high vacuum distillation or solvent extraction techniques so as to obtain dimer acid cuts of higher concentration where necessary. Polymeric fat acids may also be hydrogenated (before or after fractionation) to reduce unsaturation. Hydrogenation is generally conducted under hydrogen pressure in the presence of a hydrogenation catalyst. It is also understood that such other derivatives of polymeric fat acids which are capable of forming amides in reaction with a diamine, such as the lower alcohol (1 to 8 carbon atoms) esters of polymeric fat acids may be employed in place of the acids themselves in which the by-product is then a lower alcohol rather than water.

Set out below is a specific Example showing the preparation and properties of a typical polyamide of this invention. This Example is illustrative and does not limit the scope of the invention.

EXAMPLE

The following reactants were mixed in a stainless steel reactor designed for pressure operation.

| Reactant | Equivalent | Grams |
|---|---|---|
| Heptadecane dicarboxylic acid* | 2.21 | 364.65 |
| Mixture of 2,4,4 and 2,2,4-trimethylhexamethylene diamine | 2.26 | 178.00 |
| Dow Corning Antifoam A Compound (1% in xylene) | | 0.10 |
| Triphenyl phosphite (catalyst) | | 1.00 |
| Water | | 100.00 |

*The heptadecane dicarboxylic acid was a mixture of isomers predominantly

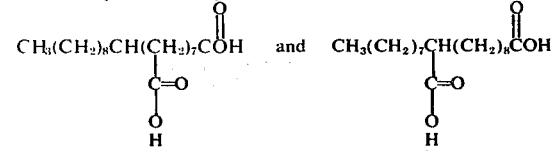

The boiling point of the mixture was 212° to 220°C. and the melting point was 45° to 55°C.

The above reactants were carefully weighed into a 1.5 liter, stainless steel reactor designed for pressure operation. The reactor was sealed and pressurized to 100 psig. with high purity nitrogen gas; then vented to atmospheric pressure. Three such purges were carried out. The reactants, in the closed vessel, were heated and stirred. At a pressure of 150 psig. autogenic pressure and a temperature of about 190°C., slow venting of water vapor was begun. The temperature was raised to 250°C. during the 100 minute venting process. Upon completion of the venting process aspirator vacuum of about 20 mm. Hg. was applied to the stirred melt at a temperature of about 260°C. for a period of 65 minutes. A high vacuum of less than 1 mm. Hg. was then applied to the melt for a period of ten minutes. The vacuum was then broken by admitting nitrogen gas. The melt was extruded from the reaction. Upon cooling of the melt a clear, light colored solid resulted.

The physical characteristics of the above-produced polyamide are shown in the Table. Also shown in the Table are the physical characteristics of a polyamide made from polymeric fatty acid (dimer acid derived from dimerizing tall oil fatty acid and resulting in a mixture of monomeric, trimeric and predominantly dimeric polymeric acid of the $C_{36}$ type) and trimethylhexamethylene diamine and a polyamide made from heptadecane dicarboxylic and hexamethylene diamine. These comparative polyamides were made by the procedure set out above.

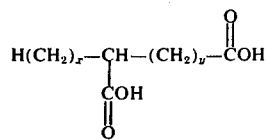

Table

|  | Polyamide resin from heptadecane dicarboxylic acid and trimethylhexamethylene diamine | Polyamide resin from polymeric fat acid and trimethylhexamethylene diamine | Polyamide resin from heptadecane decarboxylic acid and hexamethylene diamine |
| --- | --- | --- | --- |
| Clarity | transparent |  | transparent |
| Logarithmic Viscosity Number (ml./g.) | 70.7 | 48.0 | 67.2 |
| Ball and Ring Softening point (°C.) | 160 | 118 | 160 |
| Ultimate Tensile Stress (lbf/in²) | 4,000 | too soft to test | 5,500 |
| Yield Stress (lbf/in²) | 4,000 | too soft to test | 1,000 |
| Elongation (%) | 350 | too soft to test | 550 |
| Modulus of Elasticity lbf/in² | 100,000 | too soft to test | 20,000 |
| Flexural Modulus (lbf/in²) | 33,000 | too soft to test | 30,000 |

As can readily be seen, the modulus of elasticity of the polyamide resin made from heptadecane dicarboxylic acid and trimethyl hexamethylene diamine is greater than that of polyamide made from polymeric fat acid and trimethyl hexamethylene diamine or from heptadecane dicarboxylic acid and hexamethylene diamine.

The embodiments of the invention in which an exclusive property or privelege is claimed are defined as follows:

1. A polyamide resin consisting essentially of the amidification product of a mixture of isomers of heptadecane dicarboxylic acid having the formula:

wherein $x$ is an integer from 1 to 15, $y$ is an integer from 1 to 15 and the sum of $x$ and $y$ is 16, and trimethylhexamethylene diamine, wherein the equivalents of the dicarboxylic acid and the trimethylhexamethylene diamine are substantially equal, wherein the amidification reaction is conducted at a temperature between about 100°C. and 300°C., and wherein the amidification product has a logarithmic viscosity number of about 30 to 150 measured in orthochlorophenol at a concentration of 0.005 g./ml. and at a temperature of 30°C.

2. The polyamide of claim 1 wherein the logarithmic viscosity number is about 40 to 120.

* * * * *

UNITED STATES PATENT AND TRADEMARK OFFICE
CERTIFICATE OF CORRECTION

PATENT NO. : 3,957,733
DATED : May 18, 1976
INVENTOR(S) : Edgar R. Rogier, Allan H. Jevne, Gerald L. Schwebke It is certified that error appears in the above-identified patent and that said Letters Patent are hereby corrected as shown below:

Title Page "[73] Assignee: Inc. General Mills Chemicals" should read --[73] Assignee: General Mills Chemicals, Inc.--

Col. 4, lines 38, 39, 40, 41 and 42, delete

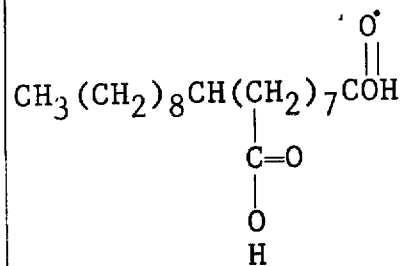

and insert

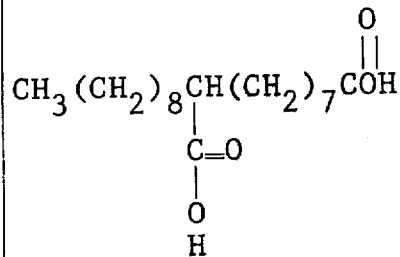

Signed and Sealed this

Twenty-first Day of September 1976

[SEAL]

Attest:

RUTH C. MASON
*Attesting Officer*

C. MARSHALL DANN
*Commissioner of Patents and Trademarks*